United States Patent
Ha et al.

(10) Patent No.: US 9,620,927 B2
(45) Date of Patent: Apr. 11, 2017

(54) HIGH-ORDER HARMONIC WAVE GENERATION APPARATUS CAPABLE OF SELECTING WAVELENGTH

(71) Applicant: AGENCY FOR DEFENSE DEVELOPMENT, Daejeon (KR)

(72) Inventors: Yeon-Chul Ha, Daejeon (KR); Jae-Hwan Lee, Daejeon (KR); Young-Il Kang, Daejeon (KR); Ki-Ho Cho, Daejeon (KR); Jae-Ihn Kim, Daejeon (KR); Joon-Young Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/063,834

(22) Filed: Mar. 8, 2016

(65) Prior Publication Data

US 2017/0047704 A1    Feb. 16, 2017

(30) Foreign Application Priority Data

Aug. 13, 2015 (KR) .................. 10-2015-0114429

(51) Int. Cl.
*H01S 3/04* (2006.01)
*H01S 3/109* (2006.01)
(Continued)

(52) U.S. Cl.
CPC .............. *H01S 3/109* (2013.01); *G02B 5/04* (2013.01); *G02B 5/208* (2013.01); *H01S 3/0401* (2013.01); *H01S 3/0405* (2013.01); *H01S 3/0941* (2013.01)

(58) Field of Classification Search
None
See application file for complete search history.

(56) References Cited

U.S. PATENT DOCUMENTS 5,796,770 A * 8/1998 Gregor ............... H01S 3/0941
                                                             372/100
6,002,697 A * 12/1999 Govorkov ............ G02F 1/3501
                                                             372/22
(Continued)

FOREIGN PATENT DOCUMENTS

| KR | 2007-0118467 A | 12/2007 |
|---|---|---|
| KR | 10-2014-0079616 A | 6/2014 |
| WO | 94/23479 A1 | 10/1994 |

*Primary Examiner* — Armando Rodriguez
(74) *Attorney, Agent, or Firm* — LRK patent Law Firm

(57) ABSTRACT

A high-order harmonic wave generation apparatus using a diode-pumped solid state laser includes a pump head for generating a fundamental wave, Porro prisms disposed on the left and right sides of the pump head, nonlinear crystals for sequentially generating a second-order harmonic wave, a fourth-order harmonic wave, and a fifth-order harmonic wave from the fundamental wave, and a final emission unit for reflecting and transmitting any one of the second-order harmonic wave, the fourth-order harmonic wave, and the fifth-order harmonic wave and for emitting the harmonic wave without changing the optical path. Accordingly, the apparatus is insensitive to changes in the external environment through a resonator having a structure comprising Porro prisms, and enables the final emission unit to selectively output the fourth-order harmonic wave or the fifth-order harmonic wave.

8 Claims, 5 Drawing Sheets

10:10a,10b, 20:20a,20b
110:110a,110b, 120:120a,120b, 13:130a,130b,130c

(51) Int. Cl.
*H01S 3/0941* (2006.01)
*G02B 5/20* (2006.01)
*G02B 5/04* (2006.01)

(56) References Cited

U.S. PATENT DOCUMENTS

2002/0111611 A1* 8/2002 Caudle ............... A61F 9/00802
                                                                                606/11
2004/0146076 A1* 7/2004 Dudley ............... H01S 3/109
                                                                                372/22

* cited by examiner

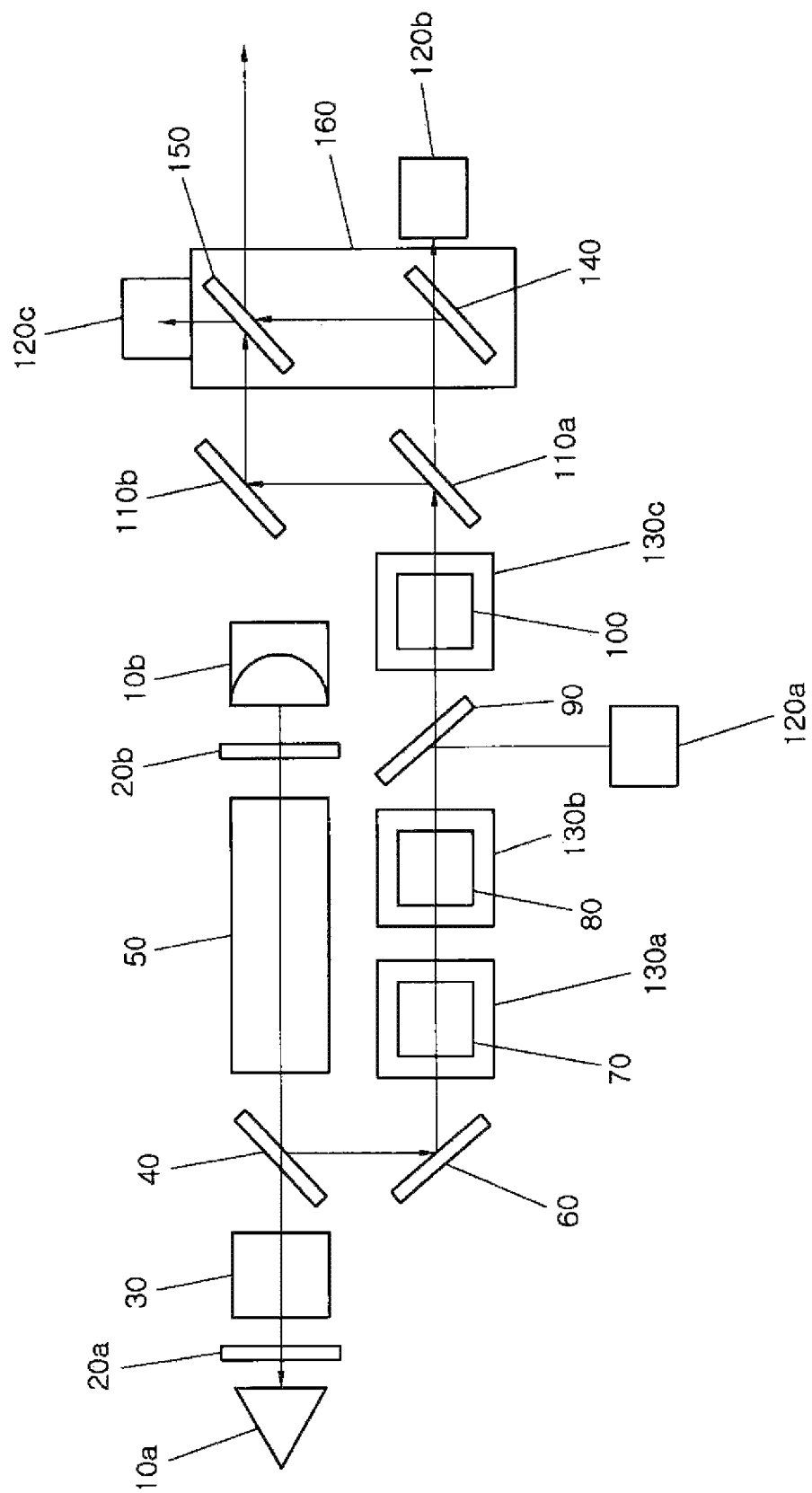

HIGH-ORDER HARMONIC WAVE GENERATION APPARATUS CAPABLE OF SELECTING WAVELENGTH

CROSS REFERENCE TO RELATED APPLICATION

This application claims the benefit of Korean Patent Application No. 10-2015-0114429, filed Aug. 13, 2015, which is hereby incorporated by reference in its entirety into this application.

BACKGROUND OF THE INVENTION

1. Technical Field

The present invention generally relates to a high-order harmonic wave generation apparatus and, more particularly, to a high-order harmonic wave generation apparatus that uses a diode-pumped solid state laser device, with which a wavelength may be selected.

2. Description of the Related Art

Generally, ultraviolet laser light is generated through frequency conversion of infrared light using a nonlinear optical crystal.

To this end, a nonlinear optical crystal may be selected from among beta barium borate (beta-$BaB_2O_4$, BBO), lithium tri-borate ($LiB_3O_5$, LBO), potassium titanyl phosphate ($KTiOPO_4$, KTP), cesium lithium borate (CLBO), and lithium niobate ($LiNbO_3$) in consideration of the phase-matching conditions of the nonlinear crystal, the polarization of incident light, and the like. Also, the effective conversion of wavelength may realize light pulses having high peak power, such as a Q-switched laser, and such high-output energy may be obtained mainly through a side-pumping scheme.

In particular, because the short wavelengths of an ultraviolet laser beam may highly enhance the intensity of signals from Raman scattering and avoid background noise, they have come into the spotlight and are widely used in the fields of primary research, basic industry, and the munitions industry.

However, a high-output energy laser system requires that a large amount of heat, resulting from energy that has not been converted into laser light, be removed using coolant, thus being inconvenient to manage and increasing the size of the system.

Also, a Fabry-Pérot laser resonator, commonly used in industrial applications, is very sensitive to optical axis alignment, external vibrations, and temperature. Therefore, when an ultraviolet laser beam is used outdoors, the Fabry-Pérot laser resonator is unsuitable because it requires environmental resistance.

SUMMARY OF THE INVENTION

Accordingly, the present invention has been made keeping in mind the above problems, and an object of the present invention is to provide a high-order harmonic wave generation apparatus that enables a final output unit to selectively output a fourth-order harmonic wave or a fifth-order harmonic wave without a change of an optical path when the high-order harmonic wave is emitted using a diode-pumped solid state laser device. In particular, the present invention intends to provide a high-order harmonic wave generation apparatus capable of selectively outputting a fourth-order harmonic wave or a fifth-order harmonic wave, which has a stable output characteristic regardless of changes in the external environment by using a laser resonator having a structure comprising Porro prisms and by maintaining the temperature of nonlinear crystals.

In order to accomplish the above object, a high-order harmonic wave generation apparatus capable of selecting a wavelength according the present invention includes: Porro prisms, arranged on a left side and a right side of a pump head in order to make a fundamental wave, generated by the pump head, insensitive to a change in an external environment; nonlinear crystals for sequentially generating a second-order harmonic wave, a fourth-order harmonic wave, and a fifth-order harmonic wave from the fundamental wave; and final emission units for reflecting and transmitting any one of the second-order harmonic wave, the fourth-order harmonic wave, and the fifth-order harmonic wave and for emitting a harmonic wave without changing an optical path.

According to a preferred embodiment of the present invention, the emitted harmonic wave has an output wavelength that is equal to or less than 300 nm, the pump head comprises a laser diode array and a gain medium, and the nonlinear crystals are any one of Beta-Barium Borate, Deuterated Potassium Dihydrogen, and Cesium Lithium Borate.

According to a preferred embodiment of the present invention, each of the nonlinear crystals is implemented along with a Thermoelectric Cooler (TEC) in order to maintain a phase-matching temperature. The nonlinear crystals comprise a second-order harmonic wave generation nonlinear crystal for generating the fundamental wave and the second-order harmonic wave, a fourth-order harmonic wave generation nonlinear crystal for generating the fundamental wave and the fourth-order harmonic wave, and a fifth-order harmonic wave generation nonlinear crystal for generating the fundamental wave and the fifth-order harmonic wave; and the final emission units select either the fourth-order harmonic wave or the fifth-order harmonic wave when emitting the harmonic wave.

According to a preferred embodiment of the present invention, the final emission units comprise a first ultraviolet filter, disposed between the fourth-order harmonic wave generation nonlinear crystal and the fifth-order harmonic wave generation nonlinear crystal, for reflecting the second-order harmonic wave and transmitting the fundamental wave and the fourth-order harmonic wave, a 2-1-th ultraviolet filter, disposed behind the fifth-order harmonic wave generation nonlinear crystal, for transmitting the fundamental wave and the fourth-order harmonic wave and reflecting the fifth-order harmonic wave, and a 2-2-th ultraviolet filter for reflecting and thereby emitting the fifth-order harmonic wave, reflected from the 2-1-th ultraviolet filter.

According to a preferred embodiment of the present invention, the final emission units comprise a first ultraviolet filter, disposed between the fourth-order harmonic wave generation nonlinear crystal and the fifth-order harmonic wave generation nonlinear crystal, for reflecting the second-order harmonic wave and transmitting the fundamental wave and the fourth-order harmonic wave, a 2-1-th ultraviolet filter, disposed behind the fifth-order harmonic wave generation nonlinear crystal, for transmitting the fundamental wave and the fourth-order harmonic wave and reflecting the fifth-order harmonic wave, a 2-2-th ultraviolet filter for reflecting and thereby emitting the fifth-order harmonic wave, reflected from the 2-1-th ultraviolet filter, and a wavelength selection substrate for selecting either the fourth-order harmonic wave or the fifth-order harmonic wave to be emitted, depending on a selection of the 2-1-th ultraviolet filter and the 2-2-th ultraviolet filter.

According to a preferred embodiment of the present invention, the wavelength selection substrate comprises a third ultraviolet filter, disposed to face the 2-1-th ultraviolet filter in a horizontal direction, for transmitting the fundamental wave and reflecting the fourth-order harmonic wave, and a fourth ultraviolet filter that is disposed to face the 2-2-th ultraviolet filter in a horizontal direction so as to reflect the fifth-order harmonic wave and simultaneously to face the third ultraviolet filter in a vertical direction so as to reflect and thereby emit the fourth-order harmonic wave, wherein when the third ultraviolet filter does not face the 2-1-th ultraviolet filter and, simultaneously, the fourth ultraviolet filter does not face the 2-2-th ultraviolet filter, the fourth-order harmonic wave is emitted. The third ultraviolet filter and the fourth ultraviolet filter are moved in a straight line by a motor.

BRIEF DESCRIPTION OF THE DRAWINGS

The above and other objects, features and advantages of the present invention will be more clearly understood from the following detailed description taken in conjunction with the accompanying drawings, in which:

FIG. 5 is a view illustrating the operation of a high-order harmonic wave generation apparatus when a fourth-order harmonic wave is selected in the second embodiment of the present invention.

DESCRIPTION OF THE PREFERRED EMBODIMENTS

Figure 1:
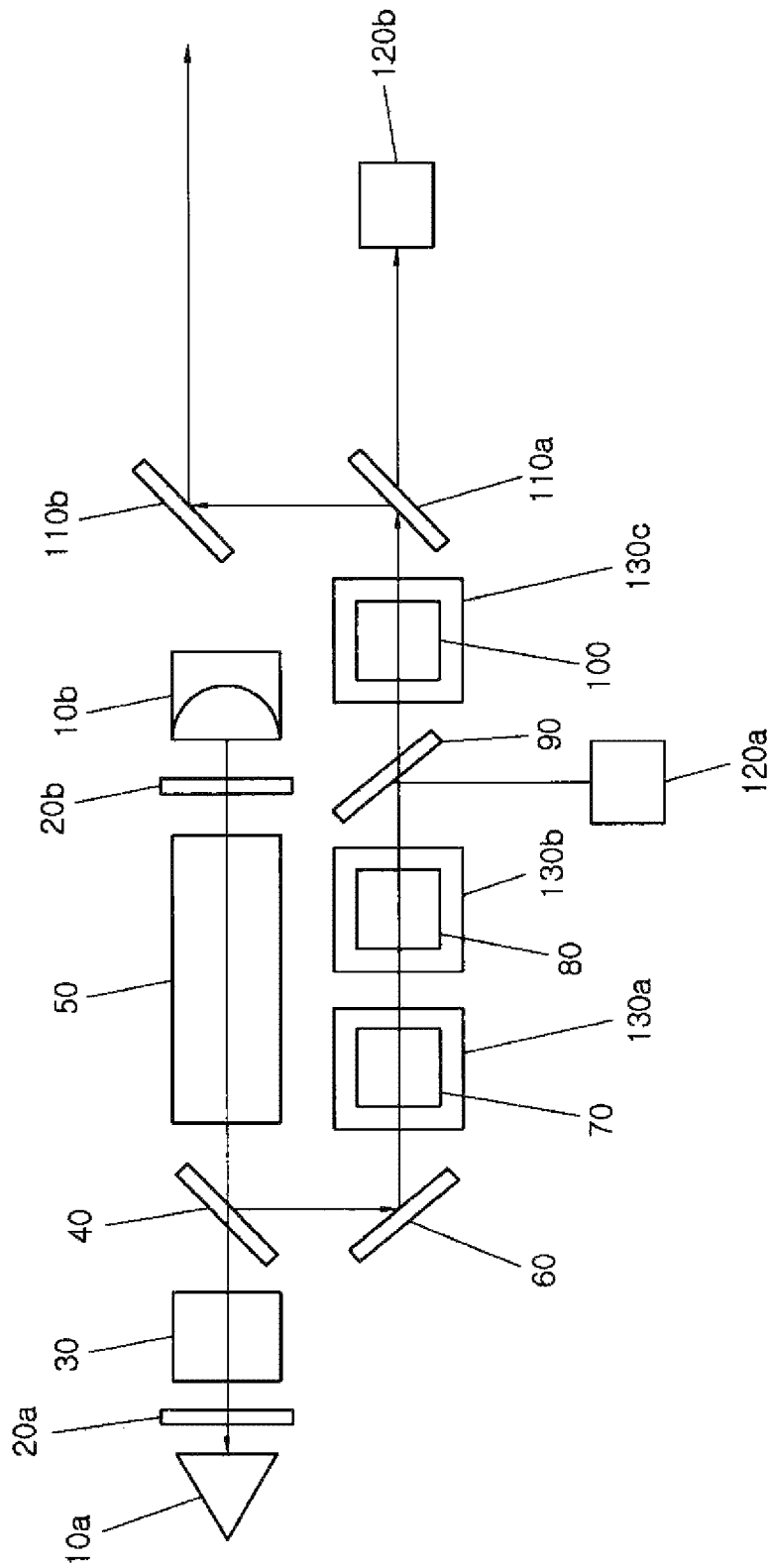
FIG. 1 is a block diagram of the first embodiment of a high-order harmonic wave generation apparatus capable of selecting a wavelength according to the present invention.

FIG. 1 illustrates a block diagram of the first embodiment of a high-order harmonic wave generation apparatus capable of selecting a wavelength according to the present invention.

As illustrated in FIG. 1, the high-order harmonic wave generation apparatus uses a diode-pumped solid state laser and includes a pump head 50, a plurality of Porro prisms 10, a plurality of quarter-wave plates 20, a Pockels cell 30, a polarizer 40, a reflector 60, a plurality of nonlinear crystals 70, 80, and 100, a plurality of ultraviolet filters 90 and 110, a plurality of beam blocks 120, and a plurality of Thermoelectric Coolers (TECs) 130.

With regard to components, the Porro prisms 10 comprise a first Porro prism 10a and a second Porro prism 10b and invert and reverse an image. The quarter-wave plates 20 comprise a first quarter-wave plate 20a and a second quarter-wave plate 20b and cause two orthogonal components of linearly polarized light to have a phase difference therebetween of one-fourth of a wavelength. The Pockels cell 30 rotates the polarization of a light beam and consists of a nonlinear crystal that polarizes light when a strong electric field is applied thereto. The polarizer 40 obtains polarized light or determines whether light is polarized. The pump head 50 comprises a laser diode array and a gain medium and generates a fundamental wave. The reflector 60 changes the optical path of a light beam. The nonlinear crystals 70, 80, and 100 comprise a second-order harmonic wave generation nonlinear crystal 70, a fourth-order harmonic wave generation nonlinear crystal 80, and a fifth-order harmonic wave generation nonlinear crystal 100, and sequentially generate harmonic waves by satisfying a phase-matching condition. The nonlinear crystals 70, 80, and 100 may be any nonlinear crystal that generates harmonic waves at a desired wavelength. As an example, the nonlinear optical crystal may use Beta-Barium Borate, Deuterated Potassium Dihydrogen, and Cesium Lithium Borate, and particularly uses Beta-Barium Borate, which enables phase matching at room temperature and undergoes little change of a phase-matching angle according to temperature. The ultraviolet filters 90 and 110 comprise a first ultraviolet filter 90 and a second ultraviolet filter 110. The second ultraviolet filter 110 comprises a 2-1-th ultraviolet filter 110a and a 2-2-th ultraviolet filter 110b and transmits a specific harmonic wave from among multiple harmonic waves generated by the nonlinear crystals 70, 80, and 100. In this case, the first and second ultraviolet filters 90 and 110 may move using a step motor. The step motor is connected to a structure for moving a support substrate in a straight line, the support substrate forming a mount on which the first and second ultraviolet filters 90 and 110 are fixed. The beam blocks 120 comprise a first beam block 120a and a second beam block 120b, and block a light beam in a certain wavelength range so as to adjust the wavelength thereof. The TECs 130, which are thermo elements, comprise a first TEC 130a, a second TEC 130b, and a third TEC 130c and maintain phase-matching temperature by controlling the temperature of the nonlinear crystals 70, 80, and 100.

With regard to layout, based on the pump head 50 for generating a fundamental wave, the first Porro prism 10a is disposed in front of the pump head 50 and the second Porro prism 10b is disposed behind the pump head 50 in order to prevent the fundamental wave from being sensitive to changes in the external environment. The first quarter-wave plate 20a is disposed between the first Porro prism 10a and the pump head 50, and the second quarter-wave plate 20b is disposed between the pump head 50 and the second Porro prism 10b. The Pockels cell 30 is disposed between the first quarter-wave plate 20a and the pump head 50. The polarizer 40 is disposed between the Pockels cell 30 and the pump head 50 in order to rotate the optical path of a light beam by 90 degrees so as to be perpendicular to the light beam incident to the polarizer 40. The reflector 60 is disposed below the polarizer 40 in order to rotate the optical path of the light beam by 90 degrees so as to be parallel to the light beam incident to the polarizer 40. The second-order harmonic wave generation nonlinear crystal 70, the fourth-order harmonic wave generation nonlinear crystal 80, and the fifth-order harmonic wave generation nonlinear crystal 100 are sequentially arranged in a line in front of the reflector 60. In particular, the second-order harmonic wave generation nonlinear crystal 70 is arranged along with the first TEC 130a, the fourth-order harmonic wave generation nonlinear crystal 80 is arranged along with the second TEC 130b, and the fifth-order harmonic wave generation nonlinear crystal 100 is arranged along with the third TEC 130c, whereby the phase-matching temperature is maintained and stable harmonic waves may be generated regardless of the outside temperature. The first ultraviolet filter 90 is disposed between the fourth-order harmonic wave generation nonlinear crystal 80 and the fifth-order harmonic wave generation nonlinear crystal 100, and the second ultraviolet filter 110 is disposed behind the fifth-order harmonic wave generation nonlinear crystal 100. Specifically, the 2-1-th ultraviolet filter 110*a* of the second ultraviolet filter 110 is disposed behind the fifth-order harmonic wave generation nonlinear crystal 100, whereas the 2-2-th ultraviolet filter 110*b* is disposed above the 2-1-th ultraviolet filter 110*a*. Accordingly, the optical path of a light beam, which has been rotated by 90 degrees by being reflected by the 2-1-th ultraviolet filter 110*a*, is rotated again by 90 degrees by the 2-2-th ultraviolet filter 110*b*, so that the optical path becomes parallel to the light beam incident on the 2-1-th ultraviolet filter 110*a*. Therefore, the first and second ultraviolet filters 90 and 110 function as a final emission unit for emitting a fifth-order harmonic wave. The first beam block 120*a* is disposed below the first ultraviolet filter 90 in order to correspond to the optical path that is perpendicular to the light beam that is incident on the first ultraviolet filter 90, and the second beam block 120*b* is disposed behind the 2-1-th ultraviolet filter 110*a*.

With regard to the operation thereof, a fundamental wave, generated by the pump head 50, forms a horizontal optical path through the first and second Porro prisms 10*a* and 10*b*, the first and second quarter-wave plates 20*a* and 20*b*, and the Pockels cell 30. The optical path of the fundamental wave is changed to be vertical by the polarizer 40. Then, the reflector 60 reflects the fundamental wave and changes the optical path thereof to a horizontal optical path, and thus the fundamental wave having the horizontal optical path enters the second-order harmonic wave generation nonlinear crystal 70. As a result, the second-order harmonic wave generation nonlinear crystal 70 generates a fundamental wave and a second-order harmonic wave from the incident fundamental wave. Then, from the fundamental wave and the second-order harmonic wave, a fundamental wave, a second-order harmonic wave, and a fourth-order harmonic wave are generated by the fourth-order harmonic wave generation nonlinear crystal 80, and the generated waves enter the first ultraviolet filter 90. Subsequently, the first ultraviolet filter 90 reflects the second-order harmonic wave but transmits the fundamental wave and the fourth-order harmonic wave, whereby the second-order harmonic wave enters the first beam block 120*a*. The fundamental wave and the fourth-order harmonic wave, which have penetrated the first ultraviolet filter 90, are converted into a fundamental wave, a fourth-order harmonic wave, and a fifth-order harmonic wave in the fifth-order harmonic wave generation nonlinear crystal 100, and the newly obtained waves enter the second ultraviolet filter 110. Then, the 2-1-th ultraviolet filter 110*a* of the second ultraviolet filter 110 reflects the fifth-order harmonic wave and transmits the fundamental wave and the fourth-order harmonic wave. Accordingly, the fifth-order harmonic wave, the optical path of which is rotated by 90 degrees by the reflection, enters the 2-2-th ultraviolet filter 110*b*, whereas the fundamental wave and the fourth-order harmonic wave enter the second beam block 120*b*. As a result, the optical path of the fifth-order harmonic wave is rotated again by 90 degrees by the 2-2-th ultraviolet filter 110*b*, and thus the fifth-order harmonic wave is emitted without a change of the optical path. Here, the output wavelength of the harmonic wave is equal to or less than 300 nm.

As described above, the high-order harmonic wave generation apparatus according to the first embodiment sequentially arranges the nonlinear crystals 70, 80, and 100, which satisfy a phase-matching condition, in a laser device in which the Porro prisms 10 are arranged on both sides of the pump head 50 so as to be insensitive to changes in the external environment, wherein the pump head 50 serves to generate a fundamental wave. Accordingly, harmonic waves are generated in the sequence of a second-order harmonic wave, a fourth-order harmonic wave, and a fifth-order harmonic wave, and only the fifth harmonic wave is emitted by arranging the ultraviolet filters 90 and 100 respectively in the back of the nonlinear crystal for generating the fourth-order harmonic wave and in the back of the nonlinear crystal for generating the fifth-order harmonic wave.

Figure 2:
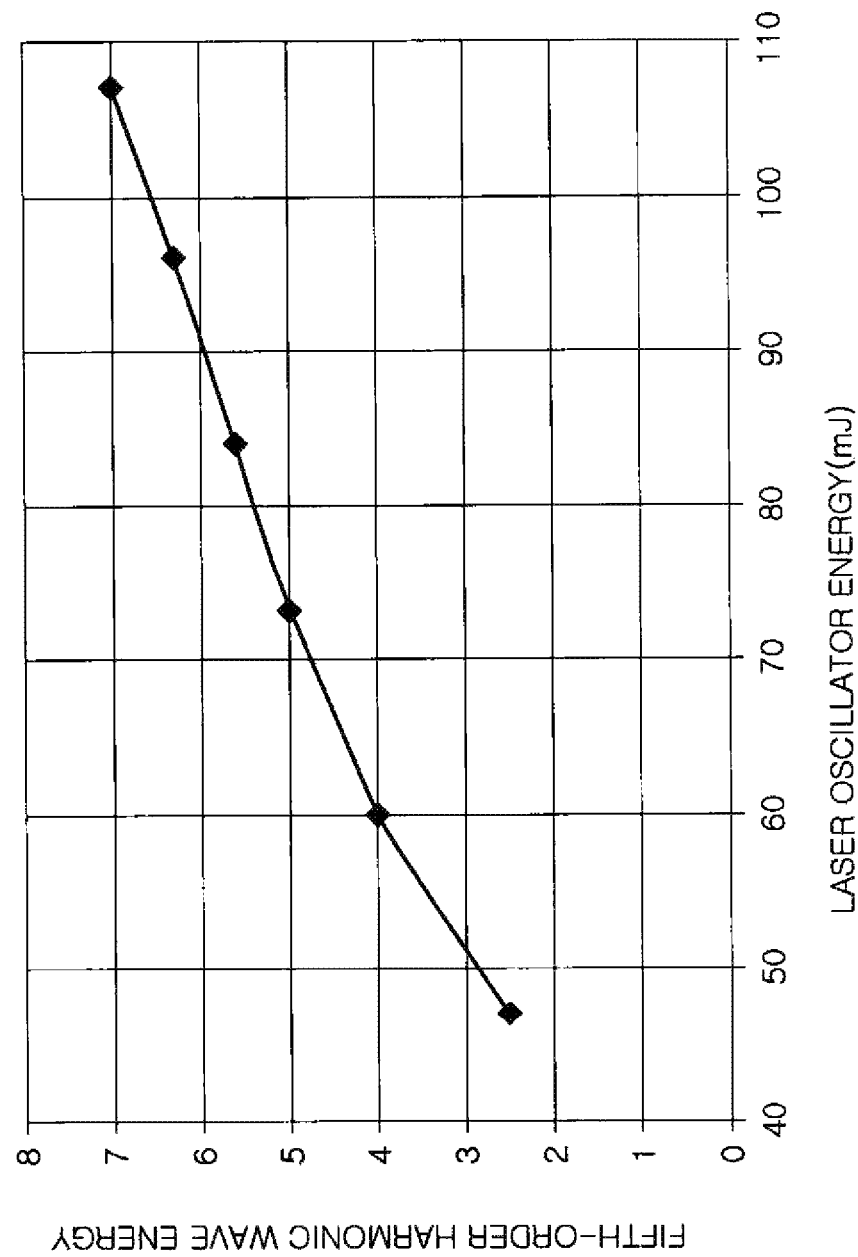
FIG. 2 is a graph illustrating the change in energy for each fifth-order harmonic wave pulse as a function of energy for each fundamental wave pulse according to the first embodiment of the present invention.

Meanwhile, FIG. 2 is a graph illustrating the change of energy that is shown in the high-order harmonic wave generation apparatus according to the first embodiment, and shows an example of energy for each fifth-order harmonic wave pulse as a function of the energy for each fundamental wave pulse.

Figure 3:
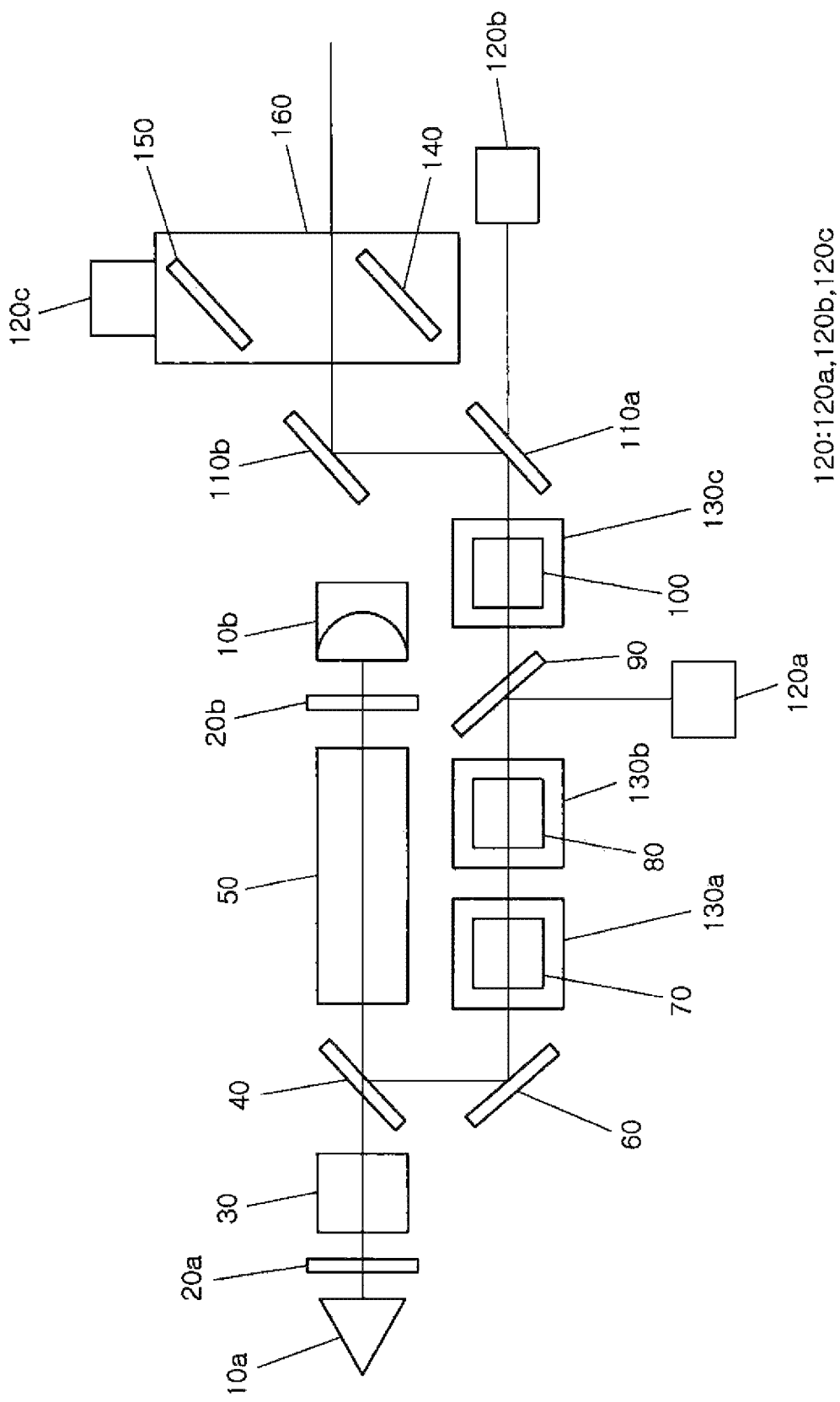
FIG. 3 is a block diagram of the second embodiment, in which a high-order harmonic wave generation apparatus according to the present invention enables a final emission unit to selectively emit a fourth-order harmonic wave or a fifth-order harmonic wave without changing an optical path.

FIG. 3 illustrates the configuration of a high-order harmonic wave generation apparatus according to the second embodiment of the present invention.

As illustrated in FIG. 3, the high-order harmonic wave generation apparatus uses a diode-pumped solid state laser and includes a pump head 50, a plurality of Porro prisms 10, a plurality of quarter-wave plates 20, a Pockels cell 30, a polarizer 40, a reflector 60, a plurality of nonlinear crystals 70, 80, and 100, a plurality of ultraviolet filters 90 and 110, a plurality of beam blocks 120, a plurality of Thermoelectric Coolers (TECs) 130, and a wavelength selection substrate 160.

In particular, the wavelength selection substrate 160 comprises third and fourth ultraviolet filters 140 and 150 and a motor (not illustrated) for selecting either the third ultraviolet filter 140 or the fourth ultraviolet filter 150 so as to select a desired wavelength, whereby a fourth-order harmonic wave or a fifth-order harmonic wave may be selected. The wavelength selection substrate 160 is a component that is not included in the high-order harmonic wave generation apparatus of the first embodiment. Here, the motor is a step motor and is connected to a structure for moving a support substrate in a straight line, the support substrate forming a mount on which the third and fourth ultraviolet filters 140 and 150 are fixed. This connection structure is a common component capable being moved by a motor.

The pump head 50, first and second Porro prisms 10*a* and 10*b* of the Porro prisms 10, first and second quarter-wave plates 20*a* and 20*b* of the quarter-wave plates 20, the Pockels cell 30, the polarizer 40, the reflector 60, the nonlinear crystals 70, 80, and 100, the ultraviolet filters 90 and 110, first and second beam blocks 120*a* and 120*b* of the beam blocks 120, and first, second, and third TECs 130*a*, 130*b*, and 130*c* of the TECs 130 are components that are the same as those of the high-order harmonic wave generation apparatus of the first embodiment. However, the beam blocks 120 further comprise a third beam block 120*c*, in addition to the first and second beam blocks 120*a* and 120*b*, and the third beam block 120*c* is connected to the fourth ultraviolet filter 150.

With regard to layout, excluding the arrangement of the wavelength selection substrate 160, the high-order harmonic wave generation apparatus of the second embodiment is the same as that of the first embodiment. As an example, in the high-order harmonic wave generation apparatus according to the second embodiment, the wavelength selection substrate 160 is disposed behind the second ultraviolet filter 110, and the third beam block 120*c* is arranged along with the wavelength selection substrate 160. Specifically, as shown in FIG. 3, the third ultraviolet filter 140 and the fourth ultraviolet filter 150 are disposed so as to deviate from the optical path of a fifth-order harmonic wave, which is emitted from the 2-2-th ultraviolet filter 110b of the second ultraviolet filter 110. Alternatively, as shown in FIG. 5, the third ultraviolet filter 140 is disposed between the 2-1-th ultraviolet filter 110a and the second beam block 120b, whereas the fourth ultraviolet filter 150 is disposed in the optical path of the fifth-order harmonic wave, which is emitted from the 2-2-th ultraviolet filter 110b of the second ultraviolet filter 110. The layout of the third ultraviolet filter 140 and the fourth ultraviolet filter 150 may be changed by driving the motor. Therefore, in addition to the first and second ultraviolet filters 90 and 110 of the first embodiment, the wavelength selection substrate 160 functions as a final emission unit for selectively emitting a fourth-order harmonic wave or a fifth-order harmonic wave.

With regard to the operation thereof, excluding the function of the wavelength selection substrate 160, the high-order harmonic wave generation apparatus of the second embodiment is the same as that of the first embodiment.

Figure 4:
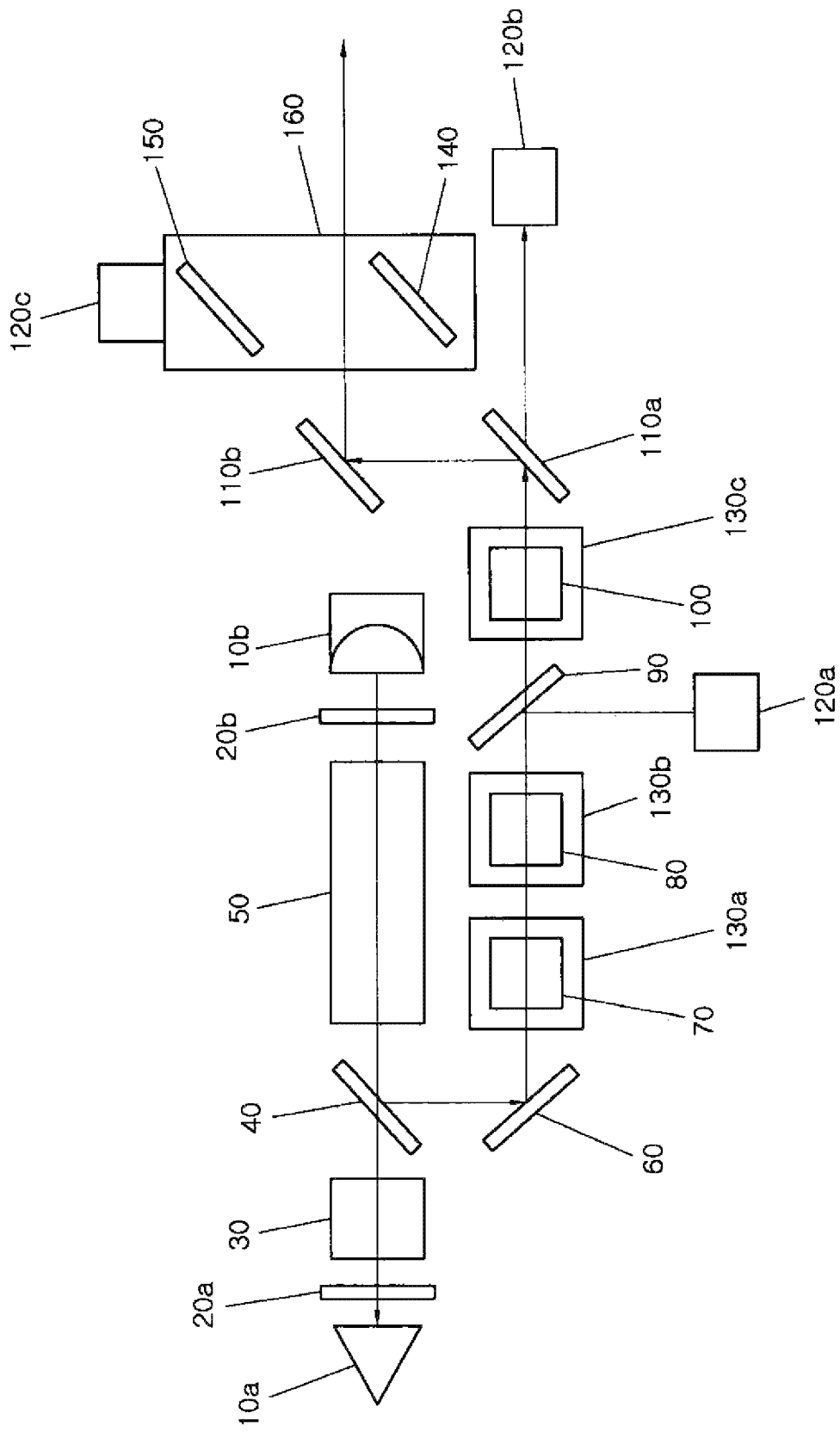
FIG. 4 is a view illustrating the operation of a high-order harmonic wave generation apparatus when a fifth-order harmonic wave is selected in the second embodiment of the present invention.

Referring to FIG. 4, the motor (not illustrated) moves the third ultraviolet filter 140 and the fourth ultraviolet filter 150 so that they are arranged respectively above and below the 2-2-th ultraviolet filter 110b of the second ultraviolet filter 110. Accordingly, the fifth-order harmonic wave having a horizontal optical path, which is emitted from the 2-2-th ultraviolet filter 110b, passes between the third ultraviolet filter 140 and the fourth ultraviolet filter 150. Therefore, the wavelength selection substrate 160 may emit the fifth-order harmonic wave.

Referring to FIG. 5, the motor (not illustrated) moves the third ultraviolet filter 140 and the fourth ultraviolet filter 150 to respectively face the 2-1-th ultraviolet filter 110a of the second ultraviolet filter 110 and the 2-2-th ultraviolet filter 110b of the second ultraviolet filter 110. As a result, among the fundamental wave and the fourth-order harmonic wave, which penetrate the 2-1-th ultraviolet filter 110a, the third ultraviolet filter 140 transmits the fundamental wave but reflects the fourth-order harmonic wave, whereby the reflected fourth-order harmonic wave enters the fourth ultraviolet filter 150. The fourth ultraviolet filter 150 reflects the fifth-order harmonic wave, which has penetrated the 2-2th ultraviolet filter 110b and is incident on the side that faces the 2-2-th ultraviolet filter 110b, and simultaneously reflects the fourth-order harmonic wave, which has been reflected from the third ultraviolet filter 140, to the other side of the fourth ultraviolet filter 150. Therefore, the wavelength selection substrate 160 may emit the fourth-order harmonic wave.

As described above, the high-order harmonic wave generation apparatus of the second embodiment enables a final emission unit to stably select a harmonic wave from among a fourth-order harmonic wave and a fifth-order harmonic wave and to emit the selected harmonic wave without changing the optical path. In this case, the output wavelength of the harmonic wave is equal to or less than 300 nm.

As described above, the high-order harmonic wave generation apparatus of the present invention realizes a stable output characteristic regardless of changes in the external environment by using a resonator having a Porro prism structure, maintaining the temperature of nonlinear crystals, and using an ultraviolet filter substrate that is driven by a motor. In particular, the high-order harmonic wave generation apparatus of the present invention has an advantage in selectively outputting a fourth-order harmonic wave or a fifth-order harmonic wave without changing the optical path.

What is claimed is:

1. A high-order harmonic wave generation apparatus for selecting a wavelength, comprising:
    Porro prisms, arranged on a left side and a right side of a pump head in order to make a fundamental wave, generated by the pump head, insensitive to a change in an external environment;
    nonlinear crystals for sequentially generating a second-order harmonic wave, a fourth-order harmonic wave, and a fifth-order harmonic wave from the fundamental wave; and
    final emission units for reflecting and transmitting the second-order harmonic wave, the fourth-order harmonic wave, and the fifth-order harmonic wave and for emitting the harmonic wave without changing an optical path,
    wherein the nonlinear crystals comprise a second-order harmonic wave generation nonlinear crystal for generating the fundamental wave and the second-order harmonic wave, a fourth-order harmonic wave generation nonlinear crystal for generating the fundamental wave and the fourth-order harmonic wave, and a fifth-order harmonic wave generation nonlinear crystal for generating the fundamental wave and the fifth-order harmonic wave, and
    wherein the final emission units comprise:
    a first ultraviolet filter, disposed between the fourth-order harmonic wave generation nonlinear crystal and the fifth-order harmonic wave generation nonlinear crystal, for reflecting the second-order harmonic wave and transmitting the fundamental wave and the fourth-order harmonic wave;
    a 2-1-th ultraviolet filter, disposed behind the fifth-order harmonic wave generation nonlinear crystal, for transmitting the fundamental wave and the fourth-order harmonic wave and reflecting the fifth-order harmonic wave; and
    a 2-2-th ultraviolet filter for reflecting and thereby emitting the fifth-order harmonic wave, reflected from the 2-1-th ultraviolet filter.

2. The high-order harmonic wave generation apparatus of claim 1, wherein the emitted harmonic wave has an output wavelength that is equal to or less than 300 nm.

3. The high-order harmonic wave generation apparatus of claim 1, wherein the pump head comprises a laser diode array and a gain medium.

4. The high-order harmonic wave generation apparatus of claim 1, wherein the nonlinear crystals are any one of Beta-Barium Borate, Deuterated Potassium Dihydrogen, and Cesium Lithium Borate.

5. The high-order harmonic wave generation apparatus of claim 1, wherein each of the nonlinear crystals is implemented along with a Thermoelectric Cooler (TEC) in order to maintain a phase-matching temperature.

6. The high-order harmonic wave generation apparatus of claim 1, wherein
    the final emission units select either the fourth-order harmonic wave or the fifth-order harmonic wave when emitting the harmonic wave.

7. A high-order harmonic wave generation apparatus for selecting a wavelength, comprising:
    Porro prisms, arranged on a left side and a right side of a pump head in order to make a fundamental wave, generated by the pump head, insensitive to a change in an external environment;

nonlinear crystals for sequentially generating a second-order harmonic wave, a fourth-order harmonic wave, and a fifth-order harmonic wave from the fundamental wave; and final emission units for reflecting and transmitting the second-order harmonic wave, the fourth-order harmonic wave, and the fifth-order harmonic wave and for emitting the harmonic wave without changing an optical path, wherein the nonlinear crystals comprise a second-order harmonic wave generation nonlinear crystal for generating the fundamental wave and the second-order harmonic wave, a fourth-order harmonic wave generation nonlinear crystal for generating the fundamental wave and the fourth-order harmonic wave, and a fifth-order harmonic wave generation nonlinear crystal for generating the fundamental wave and the fifth-order harmonic wave, wherein the final emission units select either the fourth-order harmonic wave or the fifth-order harmonic wave when emitting the harmonic wave, and wherein the final emission units comprise:

a first ultraviolet filter, disposed between the fourth-order harmonic wave generation nonlinear crystal and the fifth-order harmonic wave generation nonlinear crystal, for reflecting the second-order harmonic wave and transmitting the fundamental wave and the fourth-order harmonic wave;

a 2-1-th ultraviolet filter, disposed behind the fifth-order harmonic wave generation nonlinear crystal, for transmitting the fundamental wave and the fourth-order harmonic wave and reflecting the fifth-order harmonic wave;

a 2-2-th ultraviolet filter for reflecting and thereby emitting the fifth-order harmonic wave, reflected from the 2-1-th ultraviolet filter; and a wavelength selection substrate for selecting either the fourth-order harmonic wave or the fifth-order harmonic wave to be emitted, depending on a selection of the 2-1 th ultraviolet filter and the 2-2-th ultraviolet filter.

8. The high-order harmonic wave generation apparatus of claim 7, wherein the wavelength selection substrate comprises:

a third ultraviolet filter, disposed to face the 2-1-th ultraviolet filter in a horizontal direction, for transmitting the fundamental wave and reflecting the fourth-order harmonic wave; and a fourth ultraviolet filter that is disposed to face the 2-2-th ultraviolet filter in a horizontal direction so as to reflect the fifth-order harmonic wave and simultaneously to face the third ultraviolet filter in a vertical direction so as to reflect and thereby emit the fourth-order harmonic wave, wherein when the third ultraviolet filter does not face the 2-1-th ultraviolet filter and, simultaneously, the fourth ultraviolet filter does not face the 2-2-th ultraviolet filter, the fourth-order harmonic wave is emitted.

* * * * *